(12) United States Patent
Mizushima et al.

(10) Patent No.: US 10,190,588 B2
(45) Date of Patent: Jan. 29, 2019

(54) COMPRESSOR HAVING A CHECK VALVE IN THE INJECTION PASSAGE

(71) Applicant: DAIKIN INDUSTRIES, LTD., Osaka-shi, Osaka (JP)

(72) Inventors: Yasuo Mizushima, Sakai (JP); Yasuhiro Murakami, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 36 days.

(21) Appl. No.: 15/323,009

(22) PCT Filed: Jul. 6, 2015

(86) PCT No.: PCT/JP2015/069396
§ 371 (c)(1),
(2) Date: Dec. 29, 2016

(87) PCT Pub. No.: WO2016/006565
PCT Pub. Date: Jan. 14, 2016

(65) Prior Publication Data
US 2017/0138361 A1 May 18, 2017

(30) Foreign Application Priority Data

Jul. 8, 2014 (JP) .................. 2014-140851

(51) Int. Cl.
| | |
|---|---|
| *F04C 15/06* | (2006.01) |
| *F01C 21/10* | (2006.01) |
| *F04C 2/344* | (2006.01) |
| *F04C 29/12* | (2006.01) |

(Continued)

(52) U.S. Cl.
CPC ........ *F04C 29/128* (2013.01); *F04C 18/0215* (2013.01); *F04C 29/042* (2013.01);
(Continued)

(58) Field of Classification Search
CPC ...... F04C 15/066; F04C 15/06; F04C 2/3446; F04C 29/12; F04C 2250/101; F01C 21/108
(Continued)

(56) References Cited

U.S. PATENT DOCUMENTS

| | | | | |
|---|---|---|---|---|
| 4,531,543 A | * | 7/1985 | Markley | ................ F16K 15/02 |
| | | | | 137/513.3 |
| 5,263,822 A | | 11/1993 | Fujio | |
| 2015/0125330 A1 | | 5/2015 | Komura et al. | |

FOREIGN PATENT DOCUMENTS

| | | | | |
|---|---|---|---|---|
| JP | 04350377 A | * | 12/1992 | ............. F04C 29/12 |
| JP | 9-178010 A | | 7/1997 | |

(Continued)

OTHER PUBLICATIONS

English machine translation of JPH04350377 by Espacenet Mar. 28, 2018.*

(Continued)

*Primary Examiner* — Mark Laurenzi
*Assistant Examiner* — Deming Wan
(74) *Attorney, Agent, or Firm* — Global IP Counselors, LLP

(57) ABSTRACT

A compressor includes a housing member having an injection passage communicating with a compression chamber, a check valve in the injection passage, and an injection pipe that supplies refrigerant to the injection passage. The check valve has a slidable valve body, and a valve supporting member that restricts movement of the valve body toward the injection pipe side when the check valve checks a flow of refrigerant. A center hole is formed in the valve body. A peripheral hole is formed in the valve supporting member and opposes a rim part of the valve body. Refrigerant passes through the peripheral and center holes and is supplied to the compression chamber. The center hole can be closed by the (Continued)

valve supporting member, and the peripheral hole can be closed by the rim part of the valve body when the check valve checks the flow of refrigerant.

7 Claims, 7 Drawing Sheets

(51) Int. Cl.
*F04C 18/02* (2006.01)
*F04C 29/04* (2006.01)
*F16K 15/02* (2006.01)

(52) U.S. Cl.
CPC ...... *F04C 2210/22* (2013.01); *F04C 2240/30* (2013.01); *F16K 15/025* (2013.01)

(58) Field of Classification Search
USPC ......... 418/55.1, 270, 15; 417/298, 311, 310; 137/512.1, 516.15, 540, 529, 511, 528
See application file for complete search history.

(56) References Cited

FOREIGN PATENT DOCUMENTS

| | | |
|---|---|---|
| JP | 11-107950 A | 4/1999 |
| JP | 2013-19442 A | 1/2013 |
| WO | 2013/145713 A1 | 10/2013 |

OTHER PUBLICATIONS

European Search Report of corresponding EP Application No. 15 81 9712.9 dated Feb. 27, 2018.
International Search Report of corresponding PCT Application No. PCT/JP2015/069396 dated Oct. 6, 2015.
International Preliminary Report of corresponding PCT Application No. PCT/JP2015/069396 dated Jul. 6, 2015.

* cited by examiner

COMPRESSOR HAVING A CHECK VALVE IN THE INJECTION PASSAGE

CROSS-REFERENCE TO RELATED APPLICATIONS

This U.S. National stage application claims priority under 35 U.S.C. § 119(a) to Japanese Patent Application No. 2014-140851, filed in Japan on Jul. 8, 2014, the entire contents of which are hereby incorporated herein by reference.

TECHNICAL FIELD

The present invention relates to a compressor in which intermediate injection is performed.

BACKGROUND ART

Conventionally, intermediate injection is sometimes utilized for the purpose of improving the efficiency of a compressor used in refrigeration equipment, and an injection passage is sometimes formed in a housing member of a compressor such as a fixed scroll member in order to bring injected refrigerant to a compression chamber of the compressor. In the intermediate injection, refrigerant is injected into the compression chamber at a pressure (an intermediate pressure) between the low pressure in the refrigerating cycle and the high pressure in the refrigerating cycle.

When performing intermediate injection, there is a case that the pressure in the compression chamber into which refrigerant is to be injected becomes higher than the pressure of the injected refrigerant, and the refrigerant flows backward from the compression chamber to the side of the injection pipe. The space outside the compression chamber in which refrigerant may flow backward is a space that does not contribute to compression of the refrigerant, and the volume of this space is called "dead volume" (a volume that does not function as a compression chamber)). It is desirable that the dead volume is as small as possible, and therefore a check valve to prevent backflow of the refrigerant is sometimes arranged close to the compression chamber in the injection passage formed in the housing member.

For example, Japanese Laid-open Patent Publication No. H11-107950 discloses a compressor in which a check valve chamber, in which a cylindrical valve body moves, is arranged in an injection passage formed in a fixed scroll member. Cutouts are formed in the valve body, on an outer peripheral face being in sliding contact with an inner peripheral face of the check valve chamber, and on an end face on the side of an injection port connected to a compression chamber. Injected refrigerant passes through a fluid. passage having a passage between the outer periphery face of the valve body and the inner peripheral face of the check valve chamber (that is, the cutout portion formed in the outer peripheral face of the valve body) and a passage between the end face on the injection port side of the valve body and the opposing face abutting the end face (that is, the cutout portion formed in the end face of the valve body), and then is supplied to the compression chamber.

SUMMARY

Technical Problem

However, in a case where a check valve with the structure disclosed in Japanese Laid-open Patent Publication No. H11-107950 is used, the loss in pressure of injected refrigerant easily increases since injected refrigerant passes through the cutout formed in the outer peripheral face of the valve body, moreover passes through the cutout formed in the end face of the valve body, and then flows into the compression chamber.

An object of the present invention is to provide a compressor in which a check valve is provided in an injection passage formed in a housing member and loss of pressure of injected refrigerant can be suppressed.

Solution to Problem

A compressor according to a first aspect of the present invention is provided with a housing member, a check valve, and an injection pipe. In the housing member, an injection passage communicating with a compression chamber in which refrigerant is compressed is formed. The check valve is arranged in the injection passage. The injection pipe supplies refrigerant to the injection passage. The check valve has a valve body and a valve supporting member. The valve body is slidably arranged in the injection passage. The valve supporting member is arranged on the injection pipe side relative to the valve body, and restricts movement of the valve body toward the injection pipe side when the check valve checks a flow of refrigerant from the compression chamber to the injection pipe. A center hole is formed in a center part of the valve body. A peripheral hole is formed in the valve supporting member. The peripheral hole opposes a rim part of the valve body on the rim side relative to the center hole. Refrigerant passes through the peripheral hole and the center hole and is supplied to the compression chamber when refrigerant is supplied from the injection pipe to the compression chamber. The center hole is closed by the valve supporting member, and the peripheral hole is closed by the rim part of the valve body when the check valve checks the flow of refrigerant from the compression chamber to the injection pipe.

According to the above described aspect of the invention, the check valve has a valve body in which a center hole is formed in the center part, and refrigerant coming from the injection pipe through the injection passage and being supplied to the compression chamber passes through the center hole of the valve body and is supplied to the compression chamber. Hence, a pressure loss of injected refrigerant can be suppressed compared with a case in which refrigerant passes through a cutout formed in an outer peripheral face of a valve body, moreover passes through a cutout formed in an end face of the valve body, and then is supplied to the compression chamber.

A compressor according to a second aspect of the present invention is the compressor according to the first aspect of the present invention, in which the housing member has a valve seating face. The valve seating face is arranged on an opposite side of the valve supporting member relative to the valve body. The valve seating face restricts movement of the valve body in a direction of flow of refrigerant when refrigerant is supplied. from the injection pipe to the compression chamber. The injection passage includes an injection port arranged downstream of the valve seating face in the direction of flow of refrigerant when refrigerant is supplied from the injection pipe to the compression chamber. The injection port directly communicates with the compression chamber. Flow passage areas of the center hole and of the peripheral hole are respectively larger than a flow passage area of the injection port.

Because the flow passage area of the center hole formed in the valve body and the flow passage area of the peripheral hole formed in the valve supporting member are both larger than the flow passage area of the injection port, pressure loss of refrigerant caused by the provision of a check valve does not readily occur. Hence, pressure loss of injected refrigerant can be suppressed, and the performance of a compressor can be easily improved with the injection.

A compressor according to a third aspect of the present invention is the compressor according to the second aspect of the present invention, and is further provided with an elastic body arranged between the valve seating face and the valve body. The elastic body presses the valve body toward the valve supporting member.

Because the elastic body presses the valve body toward the valve supporting member, chattering of the valve body is easily suppressed. Further, because the valve body is pressed toward the valve supporting member by the elastic body, flowing back of refrigerant from the compression chamber to the injection pipe side relative to the valve supporting member is easily suppressed. Hence, an increase in dead volume is easily suppressed, and a compressor with higher efficiency can be realized.

A compressor according to a fourth aspect of the present invention is the compressor according to any one of the first through the third aspects of the present invention, in which a plurality of the peripheral holes are formed in the valve supporting member so as to be arranged in a point symmetry manner with respect to a center of the valve supporting member when seen from the valve body side.

If the center part of the valve body were to be pressed by refrigerant and thereby the valve body were to be moved in the injection passage, in a case when the flowing state of refrigerant makes the valve body inclined, such an inclination would be difficult to correct. Hence, the inclination of the valve body may impede smooth movement of the valve body and adversely affect prompt switching of the check valve (switching between a state in which injected refrigerant is introduced into the compression chamber and a state in which the backflow of refrigerant from the compression chamber is checked).

By contrast, in the invention according to the aspect described above, a plurality of peripheral holes are formed in the valve supporting member so as to be arranged in the point symmetry manner with respect to the center of the valve supporting member when seen from the valve body side. Hence, when refrigerant is supplied from the injection pipe to the compression chamber, the valve body is easily pressed uniformly by the flow of refrigerant, and inclination of the valve body does not readily occur. Further, even if inclination of the valve body were to occur due to the state of refrigerant flow, inclination of the valve body is more readily corrected than when the center part of the valve body is pressed because refrigerant is supplied from peripheral holes arranged in the point symmetry manner with respect to the center of the valve supporting member.

A compressor according to a fifth aspect of the present invention is the compressor according to any one of the first through the fourth aspects of the present invention, in which the housing member is a fixed scroll member.

In the aspect of the invention described above, it is possible to provide a scroll compressor in which pressure loss of injected refrigerant can be suppressed.

Advantageous Effects of Invention

In a compressor according to the present invention, the check valve has a valve body in which a center hole is formed in the center part, and refrigerant coming from the injection pipe through the injection passage and being supplied to the compression chamber passes through the center hole in the valve body and is supplied to the compression chamber. Hence, a pressure loss of injected refrigerant can be suppressed compared with a case in which refrigerant passes through a cutout formed in an outer peripheral face of a valve body, moreover passes through a cutout formed in an end face of the valve body, and then is supplied to the compression chamber.

DESCRIPTION OF EMBODIMENTS

A scroll compressor 10 according to one embodiment of a compressor of the present invention shall be described with reference to the drawings. The scroll compressor 10 of the embodiment below is merely one example of a compressor of the present invention, and it is possible to make modifications thereto as appropriate without deviating from the scope of the present invention.

(1) Overview of the Air Conditioner in which a Scroll Compressor is Used

Figure 1:
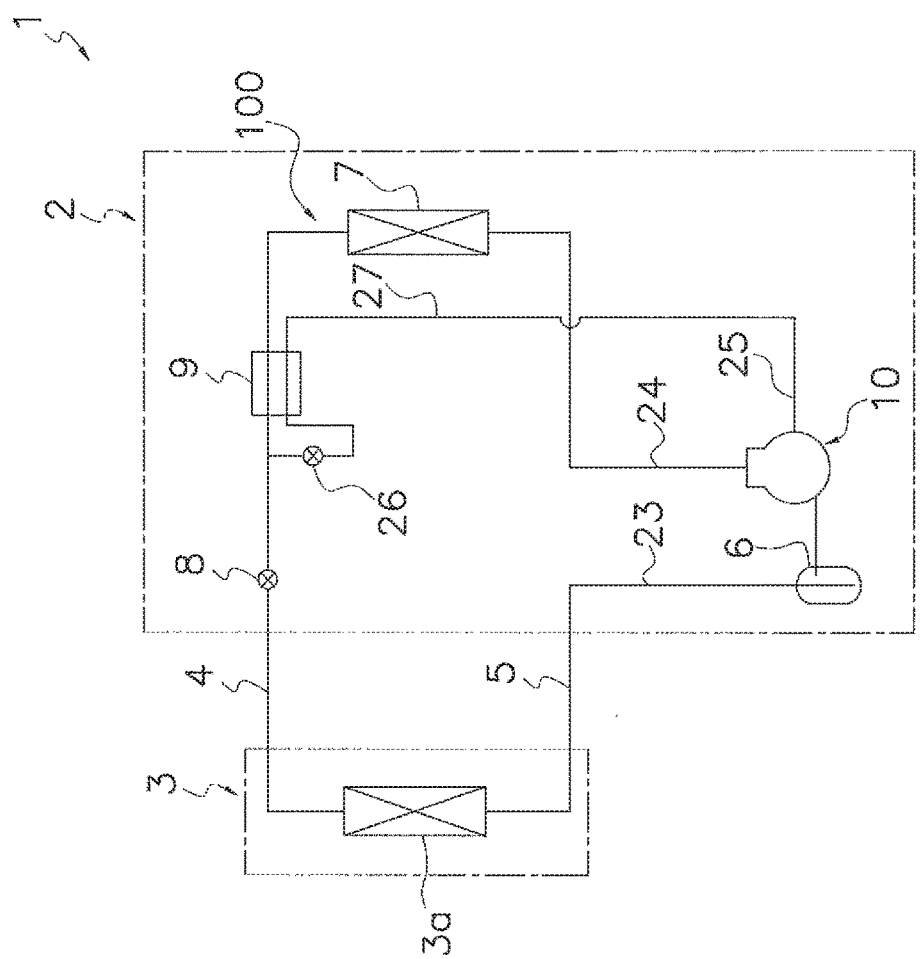
FIG. 1 is a refrigerant circuit diagram of an air conditioner in which the scroll compressor according to one embodiment of the present invention is used.

The scroll compressor 10 according to one embodiment of the present invention is a compressor used in various refrigerating apparatuses. In the present embodiment, the scroll compressor 10 is used in an air conditioner 1. FIG. 1 is a schematic view of the air conditioner 1 in which the scroll compressor 10 is used. The air conditioner 1 is an air conditioner exclusively for cooling operation. However, no limitation is provided thereby. Air conditioners using the scroll compressor 10 may be air conditioners exclusively for heating operation, or may be air conditioners capable of both cooling operation and heating operation.

The air conditioner 1 principally has an outdoor unit 2 having the scroll compressor 10, an indoor unit 3, and a liquid refrigerant interunit pipe 4 and a gas refrigerant interunit pipe 5 that connect the outdoor unit 2 and the indoor unit 3. The air conditioner 1 has a paired design as in FIG. 1, the air conditioner 1 has one outdoor unit 2 and one indoor unit 3. However, no limitation is provided thereby. The air conditioner 1 may be a multiple-unit design having a plurality of indoor units 3. In the air conditioner 1, the scroll compressor 10 and other constituent equipment described below such as an indoor heat exchanger 3a, an outdoor heat exchanger 7, and an expansion valve 8 are connected by piping, to constitute a refrigerant circuit 100 (see FIG. 1).

The indoor unit 3 principally has an indoor heat exchanger 3a, as in FIG. 1.

The indoor heat exchanger 3a is a fin-and-tube type heat exchanger with a cross-fin design, configured from a heat transfer tube and multiple heat transfer fins. The liquid side of the indoor heat exchanger 3a is connected to the liquid refrigerant interunit pipe 4, and the gas side of the indoor heat exchanger 3a is connected to the gas refrigerant interunit pipe 5. The indoor heat exchanger 3a functions as a refrigerant evaporator. In other words, the indoor heat exchanger 3a receives a supply of low-temperature liquid refrigerant from the outdoor unit 2 through the liquid refrigerant interunit pipe 4, and cools the indoor air. Refrigerant which has passed through the indoor heat exchanger 3a returns to the outdoor unit 2 through the gas refrigerant interunit pipe 5.

As indicated in FIG. 1, the outdoor unit 2 principally has an accumulator 6, the scroll compressor 10, the outdoor heat exchanger 7, the expansion valve 8, an economizer heat exchanger 9, and an injection valve 26. These devices are connected by refrigerant piping, as shown in FIG. 1.

The accumulator 6 is provided on a pipe that connects the gas refrigerant interunit pipe 5 and an intake tube 23 of the scroll compressor 10. The accumulator 6 separates the refrigerant, which flows into the intake tube 23 from the indoor heat exchanger 3a through the gas refrigerant interunit pipe 5, into the gas phase and the liquid phase in order to prevent the supply of liquid refrigerant to the scroll compressor 10. Gas-phase refrigerant that is collected in the upper space of the accumulator 6 is supplied to the scroll compressor 10.

The scroll compressor 10 compresses refrigerant that is taken in through the intake tube 23 in a compression chamber Sc described below, and then discharges the compressed refrigerant through a discharge tube 24. In the scroll compressor 10, intermediate injection, in which a portion of refrigerant flowing from the outdoor heat exchanger 7 toward the expansion valve 8 is supplied to the compression chamber Sc in the middle of compression, is performed. The scroll compressor 10 is described below.

The outdoor heat exchanger 7 is a fin-and-tube type heat exchanger with a cross-fin design, configured from a heat transfer tube and multiple heat transfer fins. One end of the outdoor heat exchanger 7 is connected to the side of the discharge tube 24 in which refrigerant discharged from the scroll compressor 10 flows, and the other end of the outdoor heat exchanger 7 is connected to the side of the liquid refrigerant interunit pipe 4. The outdoor heat exchanger 7 functions as a condenser of gas refrigerant supplied from the scroll compressor 10 through the discharge tube 24.

The expansion valve 8 is arranged on a pipe that connects the outdoor heat exchanger 7 and the liquid refrigerant interunit pipe 4. The expansion valve 8 is a motor valve for regulating the pressure and flow rate of refrigerant flowing in the pipe. The valve opening of the expansion valve 8 is adjustable.

The economizer heat exchanger 9 is arranged between the outdoor heat exchanger 7 and the expansion valve 8, as shown in FIG. 1. The economizer heat exchanger 9 is a heat exchanger that performs heat exchange between refrigerant flowing from the outdoor heat exchanger 7 toward the expansion valve 8, and refrigerant depressurized by the injection. valve 26 and flowing in an injection refrigerant supply tube 27.

The injection valve 26 is a motor valve for regulating the pressure and flow rate of refrigerant injected into the scroll compressor 10. The valve opening of the injection valve 26 is adjustable. The injection valve 26 is arranged in the injection refrigerant supply tube 27 that branches from the pipe connecting the outdoor heat exchanger 7 and the expansion valve 8. The injection refrigerant supply tube 27 is piping that supplies refrigerant to the injection pipe 25 of the scroll compressor 10.

(2) Detailed Description of the Scroll Compressor

Figure 2:
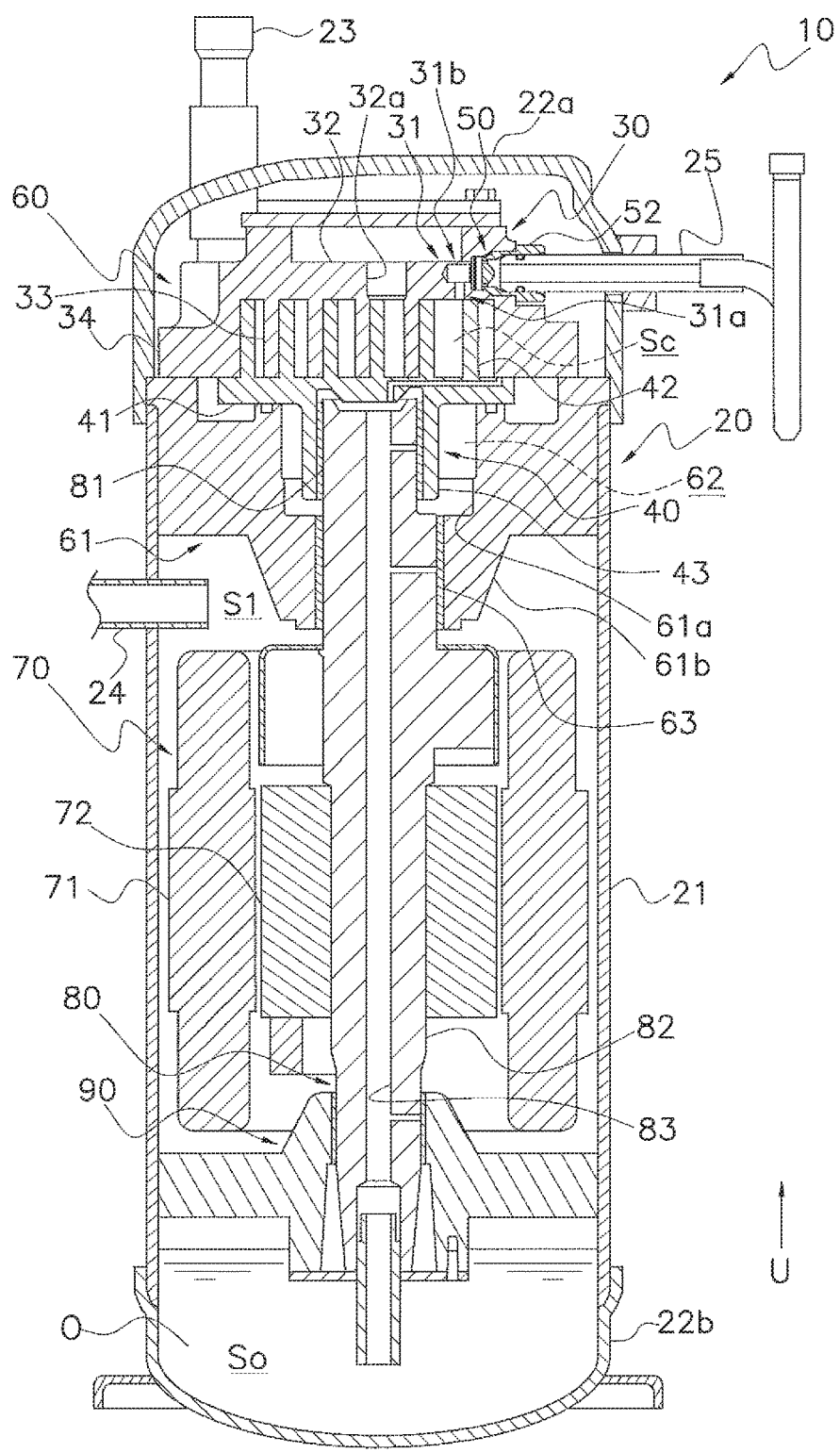
FIG. 2 is a vertical cross-sectional view of the scroll compressor according to one embodiment of the present invention.

As shown in 2, the scroll compressor 10 has a casing 20, a scroll compression mechanism 60 including a fixed scroll 30, a driving motor 70, a crankshaft 80, and a lower bearing 90. As shown in FIG. 2, the scroll compressor 10 further has a check valve 50 arranged in an injection passage 31 formed in the fixed scroll 30, and an injection pipe 25 that supplies refrigerant to the injection passage 31.

The scroll compressor 10 is described in detail below. In the following description, expressions such as "upward", "downward" and the like may be used in order to explain positional relationships of constituent members. Here, the direction of the arrow U in FIG. 2 is called upward, and the direction opposite the arrow U is called downward. Moreover, in the following description expressions such as "vertical", "horizontal", "height-wise", "width-wise", and the like may be used. Here, the up-down direction corresponds to the vertical direction and height-wise direction.

(2-1) Casing

The scroll compressor 10 has a vertically-long cylindrical casing 20. The casing 20 has a cylinder member 21 that is substantially tubular in shape and opened above and below, and an upper lid 22a and lower lid 22b arranged on the upper end and lower end respectively of the cylinder member 21. The cylinder member 21 and the upper lid 22a and the cylinder member 21 and the lower lid 22b are respectively secured by welding so as to be airtight.

In the casing 20, components of the scroll compressor 10, including the scroll compression mechanism 60, the driving motor 70, the crankshaft 80, and the lower bearing 90. Further, an oil reservoir space So is formed in the lower part of the casing 20. Refrigerating machine oil O for lubricating the scroll compression mechanism 60 and the like is collected in the oil reservoir space So.

The intake tube 23 is provided at the upper part of the casing 20 through the upper lid 22a. The intake tube 23 takes in gas refrigerant and supplies gas refrigerant to the scroll compression mechanism 60. The lower end of the intake tube 23 is connected to the fixed scroll 30 of the scroll compression mechanism 60 (see FIG. 2). The intake tube 23 communicates with the compression chamber Sc of the scroll compression mechanism 60, described below. Low-pressure refrigerant in the refrigeration cycle, prior to compression by the scroll compressor 10, flows in the intake tube 23.

The discharge tube 24 is provided at the middle part of the cylinder member 21 of the casing 20. Refrigerant discharged to the outside of the casing 20 passes through the discharge tube 24. More specifically, the discharge tube 24 is arranged such that the end part of the discharge tube 24 located inside the casing 20 protrudes into a high-pressure space S1 formed below a housing 61 of the scroll compression mechanism 60. High-pressure refrigerant in the refrigeration cycle, after compression by the scroll compression mechanism 60, flows in the discharge tube 24.

Figure 3:
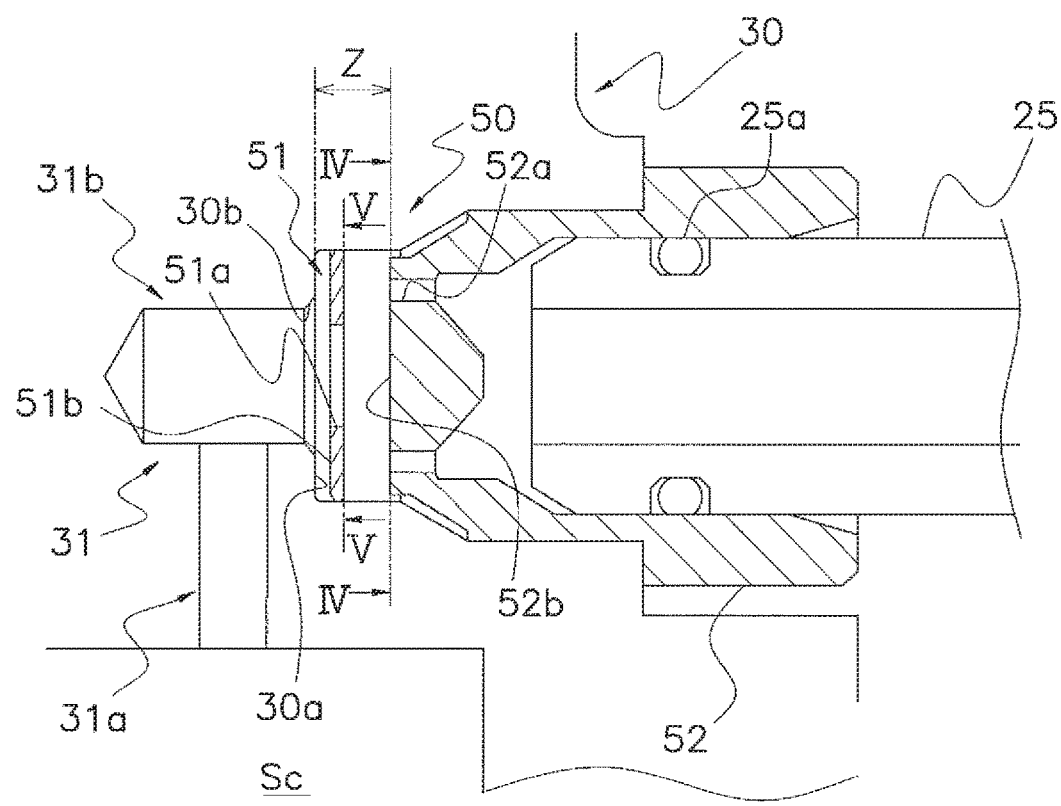
FIG. 3 is an enlargement of the vicinity of the injection passage formed in the fixed scroll of the scroll compressor of FIG. 1.

The injection pipe 25 is arranged on a side face of the upper lid 22a of the casing 20 so as to penetrate the side face of the upper lid 22a. An end part of the injection pipe 25 located outside the casing 20 is connected to the injection refrigerant supply tube 27, as shown in FIG. 1. As shown in FIG. 3, an end part of the injection pipe 25 located inside the casing 20 is connected to a valve supporting member 52 of the check valve 50, described below. The injection pipe 25 supplies refrigerant to the injection passage 31 formed in the fixed scroll 30 (see FIG. 3). The injection passage 31 communicates with the compression chamber Sc of the scroll compression mechanism 60, and refrigerant supplied from the injection pipe 25 is supplied to the compression chamber Sc through the injection passage 31. Refrigerant at a pressure (an intermediate pressure) intermediate between the low pressure and the high pressure of the refrigeration cycle is supplied from the injection pipe 25 to the injection passage 31.

(2-2) Scroll Compression Mechanism

As shown in FIG. 2, the scroll compression mechanism 60 principally has a housing 61, the fixed scroll 30 arranged above the housing 61, and a movable scroll 40 which is combined with the fixed scroll 30 so as to form the compression chamber Sc.

(2-2-1) Fixed Scroll

The fixed scroll 30 is one example of a housing member. As shown in FIG. 2, the fixed scroll 30 has a flat fixed-side end plate 32, a spiral-shape fixed-side lap 33 protruding from a front face (a lower face in FIG. 2) of the fixed-side end plate 32, and an outer rim part 34 surrounding the fixed-side lap 33.

A discharge opening 32a with a non-circular shape is formed on the center part of the fixed-side end plate 32 so as to penetrate the fixed-side end plate 32 in the thickness direction and communicates with the compression chamber Sc of the scroll compression mechanism 60. Refrigerant compressed in the compression chamber Sc is discharged from the discharge opening 32a, passes through refrigerant passages, not shown, formed in the fixed scroll 30 and in the housing 61, and flows into the high-pressure space S1.

Further, the injection passage 31, which opens on a side face of the fixed-side end plate 32 and communicates with the compression chamber Sc, is formed in the fixed-side end plate 32.

The injection passage 31 includes a horizontal passage part 31b that extends in the horizontal direction from the opening in the side face of the fixed-side end plate 32 toward the center side of the fixed-side end plate 32 (see FIG. 3). The valve supporting member 52 of the check valve 50, described below, is inserted into the horizontal passage part 31b from the opening in the side face of the fixed-side end plate 32 (see FIG. 3). The valve supporting member 52 is press-fitted into the horizontal passage part 31b to secure to the fixed scroll 30.

The horizontal passage part 31b is a circular hole, the inner diameter of Which differs depending on the place. The horizontal passage part 31b has maximum inner diameter near the opening on the side face of the fixed-side end plate 32 (see FIG. 3). The horizontal passage part 31b includes a zone Z, in which a valve body 51 of the check valve 50, described below, slides. The zone 21 is enclosed between the valve supporting member 52 which is press-fitted into the horizontal passage part 31b and a valve seating face 30a of the fixed scroll 30 (see FIG. 3). The inner diameter of the zone Z in which the valve body slides is smaller than the inner diameter of the horizontal passage part 31b near the opening on the side face of the fixed-side end plate 32 (see FIG. 3). Specifically, the horizontal passage part 31b is formed such that the inner diameter of the zone Z and the outer diameter of the disc-shape valve body 51 are substantially the same diameter. More specifically, the inner diameter of the zone Z of the horizontal passage part 31b is formed to be somewhat larger than the outer diameter of the valve body 51 such that the valve body 51 can slide in the zone Z. Further, the inner diameter of the horizontal passage part 31b in the portion on the side of the center of the fixed-side end plate 32 relative to the zone Z (the inner diameter of the portion on the side of the center of the fixed-side end plate 32 relative to the valve seating face 30a) is formed to be smaller than the inner diameter of the zone Z.

The injection passage 31 includes an injection port 31a, extending from the portion of the horizontal passage part 31b on the center side of the fixed-side end plate 32 relative to the valve seating face 30a (near the end part of the horizontal passage part 31b on the side of the center of the fixed-side end plate 32) toward the compression chamber Sc, and directly communicating with the compression chamber Sc (see FIG. 3). The injection port 31a is arranged downstream of the valve seating face 30a in the direction of flow of refrigerant when refrigerant is supplied from the injection pipe 25 to the compression chamber Sc. The injection port 31a is a circular hole.

As described below, when the driving motor 70 is started and thereby the crankshaft 80 rotates and the movable scroll 40 revolves with respect to the fixed scroll 30, the volume of the compression chamber Sc changes and the pressure in the compression chamber Sc, which communicates with the injection port 31a, changes. When the pressure of refrigerant supplied from the injection refrigerant supply tube 27 to the injection pipe 25 is higher than the pressure in the compression chamber Sc onto which the injection port 31a opens, refrigerant passes through the injection pipe 25, horizontal passage part 31b, and injection port 31a in this order, and is supplied to the compression chamber Sc. On the other hand, when the pressure of refrigerant supplied from the injection refrigerant supply tube 27 to the injection pipe 25 is lower than the pressure in the compression chamber Sc onto which the injection port 31a opens, the flow of refrigerant from the compression chamber Sc toward the injection pipe 25 is checked (blocked) by the check valve 50 arranged in the injection passage 31. The check valve 50 is described in detail below.

(2-2-1-1) Check Valve

The check valve 50 is arranged in the injection passage 31. The check valve 50 does not block the flow of refrigerant in a case where the pressure of refrigerant supplied from the injection refrigerant supply tube 27 to the injection pipe 25 is higher than the pressure in the compression chamber Sc onto which the injection port 31a opens, or in other words, when refrigerant flows from the injection pipe 25 to the compression chamber Sc. On the other hand, in a case where the pressure of refrigerant supplied from the injection refrigerant supply tube 27 to the injection pipe 25 is lower than the pressure in the compression chamber Sc onto which the injection port 31a opens, or in other words, when refrigerant is about to flow from the compression chamber Sc to the injection pipe 25, the flow is checked (blocked).

As shown in FIG. 3, the check valve 50 principally has a valve body 51 and a valve supporting member 52.

(2-2-1-1-1) Valve Body

Figure 5:
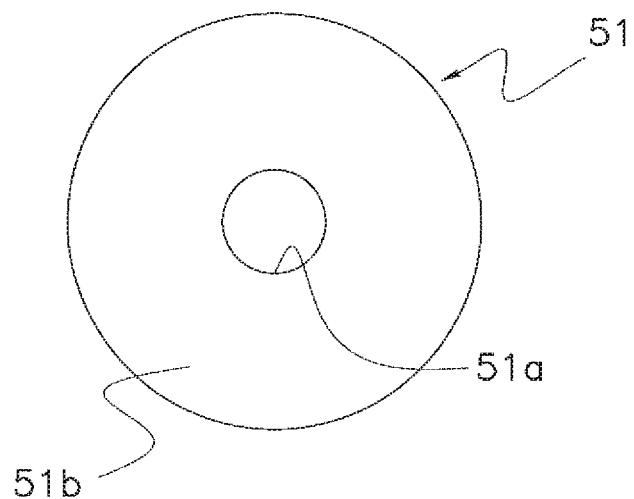
FIG. 5 is a plan view of the valve body in direction of view V-V in FIG. 3.
Figure 6:
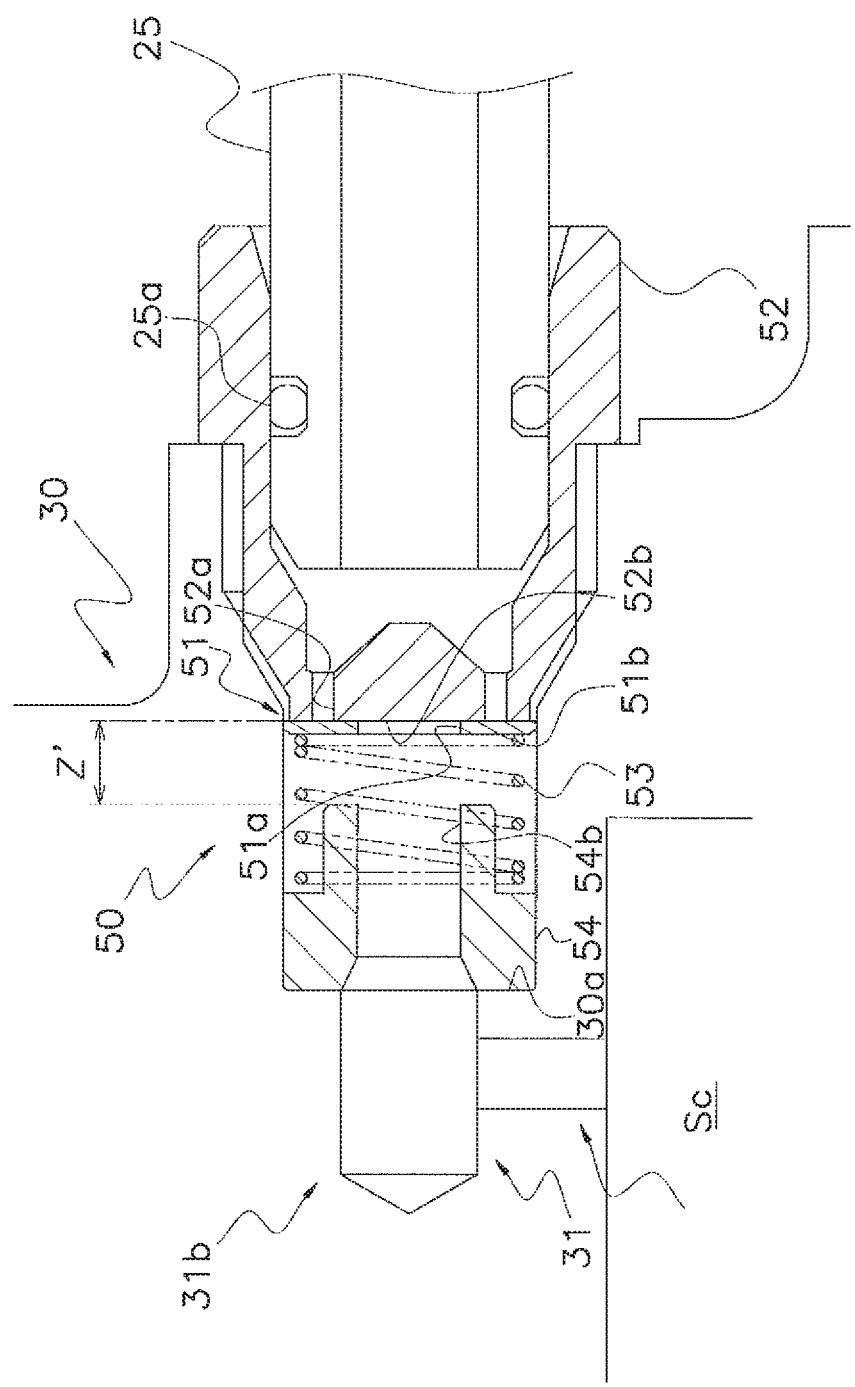
FIG. 6 is an enlargement of the vicinity of the injection passage formed in the fixed scroll of the scroll compressor according to Modification A.

As shown in FIG. 3 and FIG. 5, the valve body 51 is a thin, circular flat plate. A circular center hole 51a is formed in the center part of the valve body 51 (see FIG. 5). The valve body 51 principally has a rim part 51b formed in an annular shape, arranged on the rim side relative to the center hole 51a.

The center hole 51a formed in the valve body 51 is a hole that passes refrigerant when refrigerant is supplied from the injection passage 31 to the compression chamber Sc.

The flow passage area of the center hole 51a is larger than the flow passage area of the injection port 31a (see FIG. 3). In other words, the inner diameter of the center hole 51a is larger than the inner diameter of the injection port 31a since the center hole 51a and the injection port 31a are both circular holes.

The valve body 51 is slidably arranged in the horizontal passage part 31b of the injection passage 31. Specifically, the valve body 51 is arranged in the zone Z of the horizontal passage part 31b, which is enclosed between the valve supporting member 52 press-fitted into the horizontal passage part 31b and the valve seating face 30a of the fixed scroll 30 (see FIG. 3). The inner diameter of the zone Z of the horizontal passage part 31b is formed to be slightly larger than the outer diameter of the valve body 51, and the valve body 51 can slide in the zone Z of the horizontal passage part 31b.

If the distance between the valve seating face 30a and the valve supporting member 52 is equal to or greater than the diameter of the valve body 51, it is possible that the valve body 51 falls in the zone Z of the horizontal passage part 31b in which the valve body 51 is arranged and thereby the valve body 51 may no longer function as a valve body properly. Hence, in order that the valve body 51 does not fall in the zone Z of the horizontal passage part 31b, the distance between the valve seating face 30a and the valve supporting member 52 is designed to be as small as possible within the range in which there is no occurrence of a large loss in pressure of refrigerant flowing from the injection pipe 25 toward the compression chamber Sc.

Below are described movement of the valve body 51 according to the relation between the pressure of refrigerant supplied from the injection refrigerant supply tube 27 to the injection pipe 25 and the pressure of the compression chamber Sc onto which the injection port 31a opens, as well as the flow of refrigerant passing through the center hole 51a formed in the valve body 51 (including blocking of the flow of refrigerant passing through the center hole 51a).

In a case where the pressure of refrigerant supplied from the injection refrigerant supply tube 27 to the injection pipe 25 is higher than the pressure in the compression chamber Sc onto which the injection port 31a opens, the valve body 51 is pressed against the valve seating face 30a, arranged on the opposite side of the valve supporting member 52 relative to the valve body 51. In other words, when refrigerant is supplied from the injection pipe 25 to the compression chamber Sc, the valve seating face 30a restricts movement of the valve body 51 in the direction of refrigerant flow. Therefore. the valve seating face 30a can be called a valve restricting face.

A circular passage hole 30b is formed on the valve seating face 30a, which opposes the center hole 51a of the valve body 51 when the valve body 51 is pressed against the valve seating face 30a. The diameter of the passage hole 30b is greater than the diameter of the center hole 51a, and smaller than the outer diameter of the valve body 51. Refrigerant supplied from the injection pipe 25 passes through the center hole 51a of the valve body 51, the passage hole 30b formed in the valve seating face 30a, and the injection port 31a, and is supplied to the compression chamber Sc.

When the pressure of refrigerant supplied from the injection refrigerant supply tube 27 to the injection pipe 25 changes from a state of being higher than the pressure in the compression chamber Sc onto which the injection port 31a opens to a state of being lower, the valve body 51 being pressed against the valve seating face 30a moves toward the valve supporting member 52 and is pressed against the valve supporting member 52. In other words, when the check valve 50 checks the flow of refrigerant from the compression chamber Sc to the injection pipe 25, the valve supporting member 52 restricts movement of the valve body 51 to the injection pipe 25 side.

As described below, the valve supporting member 52 has a closing part 52b opposing the center hole 51a, which closes the center hole 51a when the valve body 51 is pressed to the valve supporting member 52. That is, when the check valve 50 checks the flow of refrigerant, the center hole 51a is closed by the closing part 52b of the valve supporting member 52, so that refrigerant that has flowed from the compression chamber Sc is restricted from passing through the center hole 51a and flowing to the injection pipe 25 side.

When the pressure of refrigerant supplied from the injection refrigerant supply tube 27 to the injection pipe 25 changes from a state of being lower than the pressure of the compression chamber Sc onto which the injection port 31a opens to a state of being higher, the valve body 51 that had been pressed against the valve supporting member 52 moves toward the valve seating face 30a, and again is pressed against the valve seating face 30a.

(2-2-1-1-2) Valve Supporting Member

The valve supporting member 52 is a hollow cylindrical member. The closing part 52b, which closes the center hole 51a formed in the valve body 51 when the check valve 50, as described above, checks the flow of refrigerant, is arranged at one end of the valve supporting member 52 (see FIG. 3). On the periphery of the closing part 52b of the valve supporting member 52, a peripheral hole 52a is formed as described below (see FIG. 3).

Figure 4:
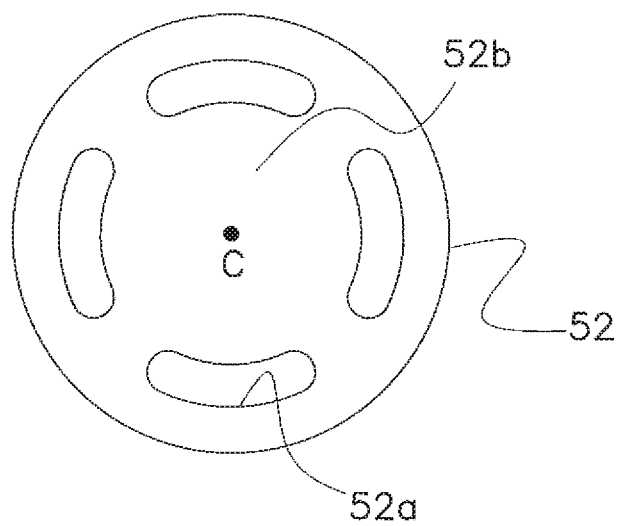
FIG. 4 is a plan view of the valve supporting member in direction of view IV-IV in FIG. 3.

The valve supporting member 52 is formed to be circular when seen from the valve body side 51, as shown in FIG. 4. When the valve supporting member 52 is seen from the valve body 51 side, a plurality of peripheral holes 52a are formed on the periphery of the closing part 52b (see FIG. 4). Each peripheral hole 52a is formed in substantially a rectangular shape. The peripheral holes 52a are formed in four places, and arranged in point symmetry manner with respect to the center C of the valve supporting member 52 when the valve supporting member 52 is seen from the valve body 51 side. The peripheral holes 52a oppose the rim part 51b of the valve body 51. The total of the flow passage areas of the four peripheral holes 52a is greater than the flow passage area of the injection port 31a.

The valve supporting member 52 is press-fitted into the horizontal passage part 31b in a state in which the end part on the side of the closing part 52b is directed to the fixed scroll 30 side (see FIG. 3). The valve body 51 is disposed between the valve supporting member 52 inserted into the horizontal passage part 31b and the valve seating face 30a of the fixed scroll 30 (see FIG. 3). The valve supporting member 52 restricts movement of the valve body 51 to the injection pipe 25 side when the check valve 50 checks the flow of refrigerant from the compression chamber Sc to the injection pipe 25. The injection pipe 25 is inserted into the hollow part of the valve supporting member 52 from opening on the end part on the side opposite the closing part 52b. The injection pipe 25 and the valve supporting member 52 are separated from the upper space of the casing 20 by an O-ring 25a attached to the injection pipe 25. The valve supporting member 52 is arranged on the injection pipe 25 side relative to the valve body 51, as in FIG. 3.

When the pressure of refrigerant supplied from the injection refrigerant supply tube 27 to the injection pipe 25 becomes higher than the pressure in the compression chamber Sc onto which the injection port 31a opens, refrigerant is supplied from the injection pipe 25 to the compression chamber Sc through the injection passage 31. When refrigerant is supplied from the injection pipe 25 to the compression chamber Sc, refrigerant passes through the four peripheral holes 52a and is supplied to the rim side of the zone Z, in which the valve body 51 slides, of the horizontal passage part 31b. Refrigerant that has passed through the peripheral holes 52a presses the rim part 51b of the valve body 51 which opposes the peripheral holes 52a, to move the valve body 51 toward the valve seating face 30a. When the valve body 51 makes contact with the valve seating face 30a, the valve body 51 is pressed against the valve seating face 30a by refrigerant that has passed through the peripheral holes 52a because movement of the valve body 51 is restricted by the valve seating face 30a. Refrigerant that has passed through the peripheral holes 52a passes through the center hole 51a of the valve body 51, the passage hole 30b of the valve seating face 30a, and the injection port 31a, and flows into the compression chamber Sc.

On the other hand, in a state in which the pressure of refrigerant supplied from the injection refrigerant supply tube 27 to the injection pipe 25 is lower than the pressure in the compression chamber Sc onto which the injection port 31a opens, the valve body 51 is moved toward the valve supporting member 52 by the flow of refrigerant flowing from the compression chamber Sc toward the injection pipe 25 as described above, and the valve body 51 is thereby pressed against the valve supporting member 52. In this state, the peripheral holes 52a are closed by the rim part 51b of the valve body 51, which opposes the peripheral holes 52a. That is, when the check valve 50 checks the flow of refrigerant, the peripheral holes 52a are closed by the rim part 51b, and therefore refrigerant that has flowed from the compression chamber Sc is restricted from passing through the peripheral holes 52a and flowing to the injection pipe 25 side.

(2-2-2) Movable Scroll

As shown in FIG. 2, the movable scroll 40 has a flat movable-side end plate 41, a spiral-shape movable-side lap 42 that protrudes from the front face (the upper face in FIG. 2) of the movable-side end plate 41, and a boss part 43 formed into a cylindrical shape that protrudes from the rear face (the lower face in FIG. 2) of the movable-side end plate 41.

The fixed-side lap 33 of the fixed scroll 30 and the movable-side lap 42 of the movable scroll 40 are combined in a state in which the lower face of the fixed-side end plate 32 and the upper face of the movable-side end plate 41 are opposed. The compression chamber Sc is formed between the adjacent fixed-side lap 33 and movable-side lap 42. When the movable scroll 40 revolves with respect to the fixed scroll 30 as described below, the volume of the compression chamber Sc changes periodically, and intake, compression, and discharge of refrigerant are performed in the scroll compression mechanism 60.

The boss part 43 is a cylindrical part in which the upper end is closed. By inserting an eccentric part 81 of the crankshaft 80, described below, into the hollow part of the boss part 43, the movable scroll 40 and the crankshaft 80 are connected. The boss part 43 is arranged in an eccentric part space 62 formed between the movable scroll 40 and the housing 61. The eccentric part space 62 communicates with the high-pressure space S1 through the oil supply pathway 83 of the crankshaft 80, described below, and high pressure is therefore exerted to the eccentric part space 62. With this high pressure, the lower face of the movable-side end plate 41 within the eccentric part space 62 is pressed upward toward the fixed scroll 30. With this force, the movable scroll 40 makes close contact with the fixed scroll 30.

The movable scroll 40 is supported by the housing 61 via an Oldham ring, not shown. The Oldham ring is a member that prevents fixed-axis rotation of the movable scroll 40 and causes revolution. By using the Oldham ring, when the crankshaft 80 rotates, the movable scroll 40, which is connected to the crankshaft 80 at the boss part 43, orbits with respect to the fixed scroll 30 without rotating, and refrigerant within the compression chamber Sc is compressed.

(2-2-3) Housing

The housing 61 is press-fitted into the cylinder member 21, and is secured to the cylinder member 21 at the outer peripheral face along the entirety of the circumferential direction. The housing 61 and the fixed scroll 30 are fastened with bolts or the like, not shown, such that the upper-end face of the housing 61 is in close contact with the lower face of the outer rim part 34 of the fixed scroll 30.

In the housing 61, a recess part 61a arranged so as to create a recess in the center part of the upper face and a bearing part 61b arranged below the recess part 61a are formed.

The recess part 61a surrounds the side face of the eccentric part space 62 in which the boss part 43 of the movable scroll 40 is disposed.

In the bearing part 61b, a bearing 63 that support the main shaft 82 of the crankshaft 80 is arranged. The main shaft 82, inserted into the bearing 63, is rotatably supported.

(2-3) Driving Motor

The driving motor 70 has a ring-shape stator 71 which is secured to an inner wall face of the cylinder member 21 and a rotor 72 which is rotatably accommodated inside the stator 71 with a slight gap (air gap passage).

The rotor 72 is connected to the movable scroll 40 via the crankshaft 80, which is disposed so as to extend in the vertical direction along the axis of the cylinder member 21. With rotation of the rotor 72, the movable scroll 40 revolves with respect to the fixed scroll 30.

(2-4) Crankshaft

The crankshaft 80 transmits the driving force of the driving motor 70 to the movable scroll 40. The crankshaft 80 is arranged so as to extend in the vertical direction along the axis of the cylinder member 21, and connects the rotor 72 of the driving motor 70 with the movable scroll 40 of the scroll compression mechanism 60.

The crankshaft 80 has a main shaft 82 and an eccentric part 81. The axis of the main shaft 82 coincides with the axis of the cylinder member 21. The eccentric part 81 is made eccentric with respect to the axis of the cylinder member 21.

The eccentric part 81 is inserted into the boss part 43 of the movable scroll 40, as described above.

The main shaft 82 is rotatably supported by the bearing 63 of the bearing part 61b of the housing 61 and by the lower bearing 90, described below. The main shaft 82 is connected with the rotor 72 of the driving motor 70 between the bearing part 61b and the lower bearing 90.

In the crankshaft 80, an oil supply pathway 83 to supply refrigerating machine oil O to the scroll compression mechanism 60 and the like is formed. The lower end of the main shaft 82 is positioned within the oil reservoir space So formed in the lower part of the casing 20, and refrigerating machine oil O in the oil reservoir space So is supplied through the oil supply pathway 83 to the scroll compression mechanism 60 and the like.

(2-5) Lower Bearing

The lower bearing 90 is disposed below the driving motor 70. The lower bearing 90 is secured to the cylinder member 21. The lower bearing 90 constitutes the bearing on the lower-end side of the crankshaft 80, and rotatably supports the main shaft 82 of the crankshaft 80.

(3) Operation of the Scroll Compressor

Operation of the scroll compressor 10 is described.

When the driving motor 70 is started, the rotor 72 rotates with respect to the stator 71, and the crankshaft 80, which is secured to the rotor 72, rotates. When the crankshaft 80 rotates, the movable scroll 40, which is connected to the crankshaft 80, revolves with respect to the fixed scroll 30. Then, low-pressure gas refrigerant in the refrigeration cycle passes through the intake tube 23 and is taken into the compression chamber Sc from the rim side of the compression chamber Sc. As the movable scroll 40 revolves, the intake tube 23 and the compression chamber Sc cease to communicate, and as the volume of the compression chamber Sc decreases, the pressure in the compression chamber Sc begins to rise.

Refrigerant is injected from the injection port 31*a* into the compression chamber Sc being in the middle of compression. As described above, in a case where the pressure of refrigerant supplied to the injection pipe 25 from the injection refrigerant supply tube 27 is higher than the pressure in the compression chamber Sc onto which the injection port 31*a* opens, refrigerant is supplied to the compression chamber Sc from the injection pipe 25 through the injection passage 31. On the other hand, when the pressure of refrigerant supplied from the injection refrigerant supply tube 27 to the injection pipe 25 is lower than the pressure in the compression chamber Sc onto which the injection port 31*a* opens, the check valve 50 functions to check (block) the flow of refrigerant from the compression chamber Sc to the injection pipe 25.

The compression chamber Sc ceases to communicate with the injection port 31*a* as refrigerant compression advances. Refrigerant within the compression chamber Sc is compressed as the volume of the compression chamber Sc decreases, and finally becomes high-pressure gas refrigerant. High-pressure gas refrigerant is discharged from the discharge opening 32*a* positioned near the center of the fixed-side end plate 32. Then, high-pressure gas refrigerant passes through the refrigerant passageway, not shown, formed in the fixed scroll 30 and the housing 61, and flows into the high-pressure space S1. The gas refrigerant at the high pressure in the refrigeration cycle that has flowed into the high-pressure space S1 after compression by the scroll compression mechanism 60 is discharged from the discharge tube 24.

(4) Features (4-1)

The scroll compressor 10 of the present embodiment is provided with a fixed scroll 30 as a housing member, a check valve 50, and an injection pipe 25. In the fixed scroll 30, an injection passage 31 communicating with the compression chamber Sc in which refrigerant is compressed is formed. The check valve 50 is arranged in the injection passage 31. The injection pipe 25 supplies refrigerant to the injection passage 31. The check valve 50 has a valve body 51 and a valve supporting member 52. The valve body 51 is slidably arranged in the injection passage 31. The valve supporting member 52 is arranged on the injection pipe 25 side relative to the valve body 51, and restricts movement of the valve body 51 toward the injection pipe 25 side when the check valve 50 checks the flow of refrigerant from the compression chamber Sc to the injection pipe 25. A center hole 51*a* is formed in the center part of the valve body 51. A peripheral hole 52*a* is formed in the valve supporting member 52. The peripheral hole 52*a* opposes the rim part 51*b* of the valve body 51 on the rim side relative to the center hole 51*a*. Refrigerant passes through the peripheral hole 52*a* and center hole 51*a* and is supplied to the compression chamber Sc when refrigerant is supplied from the injection pipe 25 to the compression chamber Sc. The center hole 51*a* is closed by the valve supporting member 52, and the peripheral hole 52*a* is closed by the rim part 51*b* of the valve body 51 when the check valve 50 checks the flow of refrigerant from the compression chamber Sc to the injection pipe 25.

In this embodiment, the check valve 50 has a valve body 51 in which a center hole 51*a* is formed at the center part, and refrigerant coming from the injection pipe 25 through the injection passage 31 and being supplied to the compression chamber Sc passes through the center hole 51*a* of the valve body S1 and is supplied to the compression chamber Sc. Hence, a pressure loss of the injected refrigerant can be suppressed compared with a case in which refrigerant passes through a cutout formed in an outer peripheral face of a valve body 51, moreover passes through a cutout formed in an end face of the valve body, and then is supplied to the compression chamber. That is, in this embodiment, it is possible to provide a scroll compressor 10 in which pressure loss of injected refrigerant can be suppressed.

Further, by arranging the check valve 50 as described above in the injection passage 31, in addition to the suppression of the pressure loss of injected refrigerant, pulsation caused in the injection pipe 25 can be suppressed. Vibration of the injection pipe 25 can therefore be suppressed.

(4-2)

In the scroll compressor 10 of the present embodiment, the fixed scroll 30 has a valve seating face 30*a*. The valve seating face 30*a* is arranged on an opposite side of the valve supporting member 52 relative to the valve body 51. The valve seating face 30*a* restricts movement of the valve body 51 in the direction of flow of refrigerant when refrigerant is supplied from the injection pipe 25 to the compression chamber Sc. The injection passage 31 includes an injection port 31*a* arranged downstream of the valve seating face 30*a* in the direction of flow of refrigerant when refrigerant is supplied from the injection pipe 25 to the compression chamber Sc. The injection port 31*a* directly communicates with the compression chamber Sc. The flow passage areas of the center hole 51*a* and of the peripheral hole 52*a* are respectively larger than the flow passage area of the injection port 31*a*.

Because the flow passage area of the center hole 51*a* formed in the valve body 51 and the flow passage area of the peripheral hole 52*a* formed in the valve supporting member 52 (the total of the flow passage areas of peripheral holes 52*a*) are both larger than the flow passage area of the injection port 31*a*, pressure loss of refrigerant caused by the provision of the check valve 50 does not readily occur. Hence, pressure loss of injected refrigerant can be suppressed, and the performance of the scroll compressor 10 can easily be improved with the injection.

(4-3)

In the scroll compressor 10 of the present embodiment, a plurality of peripheral holes 52*a* are formed in the valve supporting member 52 so as to be arranged in a point symmetry with respect to the center C of the valve supporting member 52 when seen from the valve body side 51.

If the center part of the valve body 51 were to be pressed by refrigerant and thereby the valve body 51 were to be moved in the injection passage 31, in a case when the flowing state of refrigerant makes the valve body 51 inclined, such an inclination would be difficult to correct. Hence, the inclination of the valve body 51 may impede smooth movement of the valve body 51 and adversely affect prompt switching of the check valve 50 (switching between a state in which injected refrigerant is introduced into the compression chamber Sc and a state in which the backflow of refrigerant from the compression chamber Sc is checked).

By contrast, in the present embodiment, a plurality of peripheral holes 52a are formed in the valve supporting member 52 so as to be arranged in the point symmetry manner with respect to the center C of the valve supporting member 52 when seen from the valve body side 51 side. Hence, when refrigerant is supplied from the injection pipe 25 to the compression chamber Sc, the valve body 51 is easily pressed uniformly by the flow of refrigerant, and inclination of the valve body 51 does not readily occur. Further, even if inclination of the valve body 51 were to occur due to the state of refrigerant flow, inclination of the valve body 51 is more readily corrected than when the center part of the valve body 51 is pressed because refrigerant is supplied from peripheral holes 52a arranged in the point symmetry manner with respect to the center C of the valve supporting member 52.

(5) Modifications

Below, modifications of the above embodiment are described. A plurality of modifications may be combined, insofar as there are no inconsistencies.

(5-1) Modification A

In addition to the configuration of the scroll compressor 10 of the above embodiment, an elastic body may be disposed between the valve seating face 30a and the valve body 51, to press the valve body 51 toward the valve supporting member 52. For example, a spring 53 may be disposed between the valve seating face 30a and the valve body 51 to press the valve body 51 toward the valve supporting member 52. The spring 53 is configured so as to press the valve body 51 against the valve supporting member 52 until the pressure on the injection pipe 25 side becomes larger, by a prescribed value, than the pressure in the compression chamber Sc onto which the injection port 31a communicates. A spring seat 54 that supports the spring 53 is arranged between the spring 53 and the valve seating face 30a. In the scroll compressor of Modification A, the valve body 51 can slide in the zone Z' of the horizontal passage part 31b enclosed between the spring seat 54 and the valve supporting member 52. In the scroll compressor of Modification A, the valve body 51 does not make direct contact with the valve seating face 30a. When refrigerant is supplied from the injection pipe 25 to the compression chamber Sc, the valve seating face 30a restricts movement of the valve body 51 in the direction of refrigerant flow through the spring seat 54 which is secured to the valve seating face 30a. A circular passage hole 54b is formed in the spring seat 54. The circular passage hole 54b opposes the center hole 51a. of the valve body 51 when the valve body 51 is pressed against the seat spring 54.

Because the spring 53 presses the valve body 51 toward the valve supporting member 52, chattering of the valve body 51 is easily suppressed. Further, because the spring 53 presses the valve body 51 toward the valve supporting member 52, even in a case in which the pressure in the compression chamber Sc that communicates with the injection port 31a is slightly higher than the pressure on the injection pipe 25 side, the check valve 50 can be made to function. That is, even in a case in which there is almost no difference in pressure between the injection pipe 25 side and the compression chamber Sc that communicates with the injection port 31a, backflow of refrigerant from the compression chamber Sc to the injection pipe 25 side relative to the valve supporting member 52 is readily suppressed. Hence, an increase in dead volume is easily suppressed, and a scroll compressor 10 with good efficiency can be realized.

(5-2) Modification B

In the above embodiment, the compressor is a scroll compressor 10, but no limitation is provided thereby. The invention can also be applied to a compressor of a different design in which a check valve is provided in an injection passage formed in a housing member of a compression mechanism.

(5-3) Modification C

The shapes of the valve body 51 and the valve supporting member 52 in the above embodiment are mere examples, and no limitation is provided thereby.

For example, in the above embodiment, the valve body 51 is a circular plate arranged in an injection passage 31 formed with a circular cross-section; but the valve body may be a plate with an ellipsoidal shape, a polygonal shape, or some other shape, and the cross-section of the injection passage may be formed in a shape corresponding to the shape of the valve body. The same is true of the shape of the valve supporting member 52.

Moreover, the cross-sectional shape of the center hole 51a of the valve body 51 and the shape of the peripheral hole 52a of the valve supporting member 52 are not limited to the shapes described in the embodiment.

(5-4) Modification D

In the above embodiment, the valve body 51 is a thin plate, but no limitation is provided thereby. The valve body 51 may be a member with a thick cylindrical shape such that inclination in the horizontal passage part 31b does not occur readily. However, in order to switch the check valve 50 promptly (switch between a state in which injected refrigerant is introduced into the compression chamber and a state in which backflow of refrigerant from the compression chamber is checked), it is desirable that the valve body 51 is thin.

(5-5) Modification E In the above embodiment, peripheral holes 52a are formed at four places in the valve supporting member 52, but no limitation is provided thereby. Peripheral holes 52a may be formed at two places, or at six or more places, so as to be arranged in a point symmetry manner with respect to the center C of the valve supporting member 52.

Figure 7:
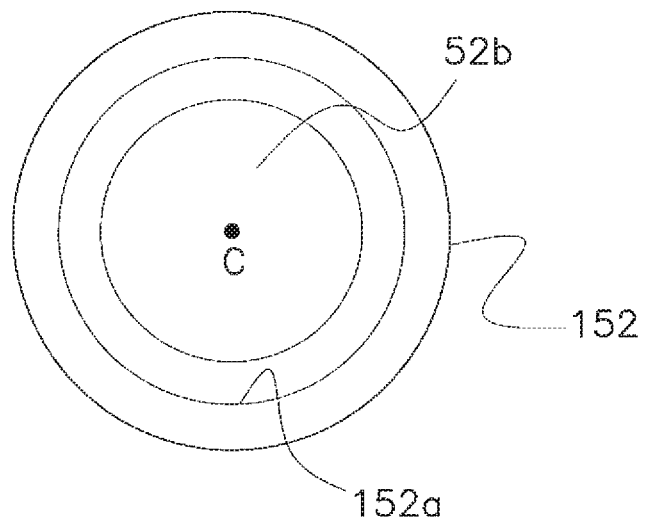
FIG. 7 is a plan view of the valve supporting member of the scroll compressor according to Modification C, and is a plan view, seen from the same viewpoint as FIG. 4, of the valve supporting member of the scroll compressor according to Modification C.

Further, for example, a peripheral hole 152a in a valve supporting member 152 may be a ring-shape hole extending in the circumferential direction so as to enclose the center C of the valve supporting member 152, as in FIG. 7. Apart from the peripheral hole 152a, the valve supporting member 152 and the valve supporting member 52 are similar.

Further, peripheral holes 52a are formed in the valve supporting member 52 so as to be arranged in a point symmetry manner with respect to the center C of the valve supporting member 52, but no limitation is provided thereby. For example, peripheral holes 52a may be formed in the valve supporting member 52 at an odd number of places on the periphery of the center C. However, it is desirable that the peripheral holes 52a is disposed such that the rim part 51b of the valve body 51 is pressed without bias, and it is desirable that peripheral holes 52*a* are arranged in a point symmetry manner with respect to the center C of the valve supporting member 52.

(5-6) Modification F

In the scroll compressor 10 of the above embodiment, the valve supporting member 52 is secured to the fixed scroll 30 by press-fitting into the horizontal passage part 31*b*, but the securing method is merely an example, and no limitation is provided thereby. For example, a configuration may be used in which the fixed scroll 30 and the valve supporting member 52 are secured by screwing a male thread formed in the valve supporting member 52 into a female thread formed in the fixed scroll 30.

(5-7) Modification G

In the scroll compressor 10 of the above embodiment, the shape of the hole in the injection port 31*a* is circular, but no limitation is provided thereby. The shape of the hole in the injection port 31*a* may be other than circular. In this case also, it is desirable that the flow passage area of the center hole 51*a* of the valve body 51 is larger than the flow passage area of the injection port 31*a*. Further, it is preferable that the flow passage area of the peripheral hole 52*a* in the valve supporting member 52 (the total of the flow passage areas of peripheral holes 52*a*) is larger than the flow passage area of the injection port 31*a*.

INDUSTRIAL APPLICABILITY

The compressor of the present invention is useful as a compressor which enables suppression of pressure loss of injected refrigerant in a case where a check valve is provided in an injection passage formed in a housing member.

What is claimed is:

1. A compressor, comprising:
a housing member having an injection passage formed therein, the injection passage communicating with a compression chamber where refrigerant is compressed and which is in the middle of compression;
a check valve arranged in the injection passage; and
an injection pipe arranged and configured to supply refrigerant to the injection passage;
the check valve having
a valve body slidably arranged in the injection passage, and
a valve supporting member arranged on an injection pipe side relative to the valve body,
the valve supporting member being arranged and configured to restrict movement of the valve body toward the injection pipe side when the check valve checks a flow of refrigerant from the compression chamber to the injection pipe,
a center hole being formed in a center part of the valve body,
a peripheral hole being formed in the valve supporting member, the peripheral hole opposing a rim part of the valve body located on a rim side relative to the center hole, with refrigerant passing through the peripheral hole and the center hole and being supplied to the compression chamber when refrigerant is supplied from the injection pipe to the compression chamber,
the center hole being arranged and configured to be closed by the valve supporting member, and the peripheral hole being arranged and configured to be closed by the rim part of the valve body when the check valve checks the flow of refrigerant from the compression chamber to the injection pipe,
the housing member having a valve restricting face arranged on an opposite side of the valve supporting member relative to the valve body, the valve restricting face being arranged and configured to restrict movement of the valve body in a direction of flow of refrigerant when refrigerant is supplied from the injection pipe to the compression chamber,
the injection passage including an injection port arranged downstream of the valve restricting face in the direction of flow of refrigerant when refrigerant is supplied from the injection pipe to the compression chamber, and the injection port directly communicating with the compression chamber, and
a flow passage area of the center hole formed in the valve body being larger than a flow passage area of the injection port, and a total flow passage area of the peripheral hole formed in the valve supporting member being larger than the flow passage area of the injection port.

2. The compressor according to claim 1, further comprising
an elastic body arranged between the valve restricting face and the valve body,
the elastic body being arranged and configured to press the valve body toward the valve supporting member.

3. The compressor according to claim 2, wherein
the peripheral hole includes a plurality of the peripheral holes formed in the valve supporting member so as to be arranged in a symmetrical manner with respect to a center of the valve supporting member when viewed from a valve body side.

4. The compressor according to claim 2, wherein
the housing member is a fixed scroll member.

5. The compressor according to claim 1, wherein
the peripheral hole includes a plurality of the peripheral holes formed in the valve supporting member so as to be arranged in a symmetrical manner with respect to a center of the valve supporting member when viewed from a valve body side.

6. The compressor according to claim 5, wherein
the housing member is a fixed scroll member.

7. The compressor according to claim 1, wherein
the housing member is a fixed scroll member.

* * * * *